April 30, 1963 W. B. DOW 3,087,232
METHOD OF MANUFACTURING VALVE SEAT
Filed Sept. 11, 1959 2 Sheets-Sheet 2
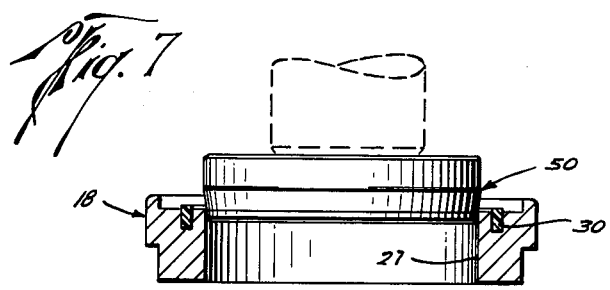
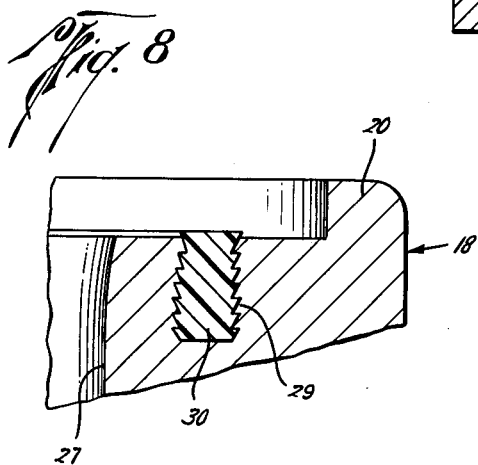
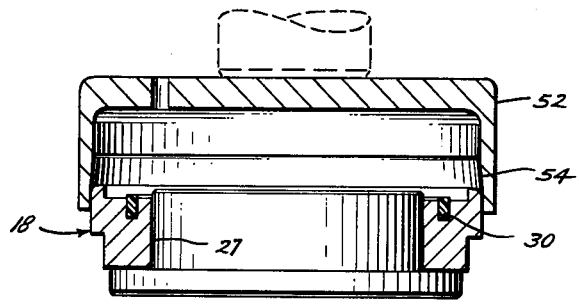
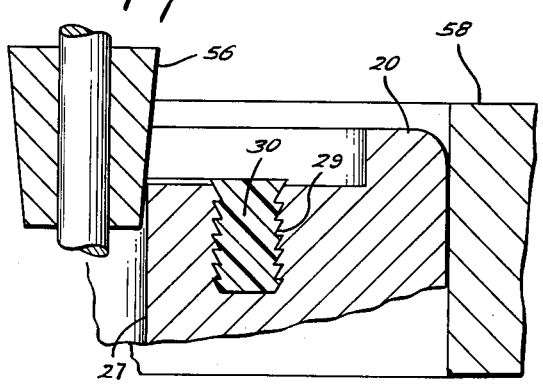
William B. Dow
INVENTOR.
BY
ATTORNEY

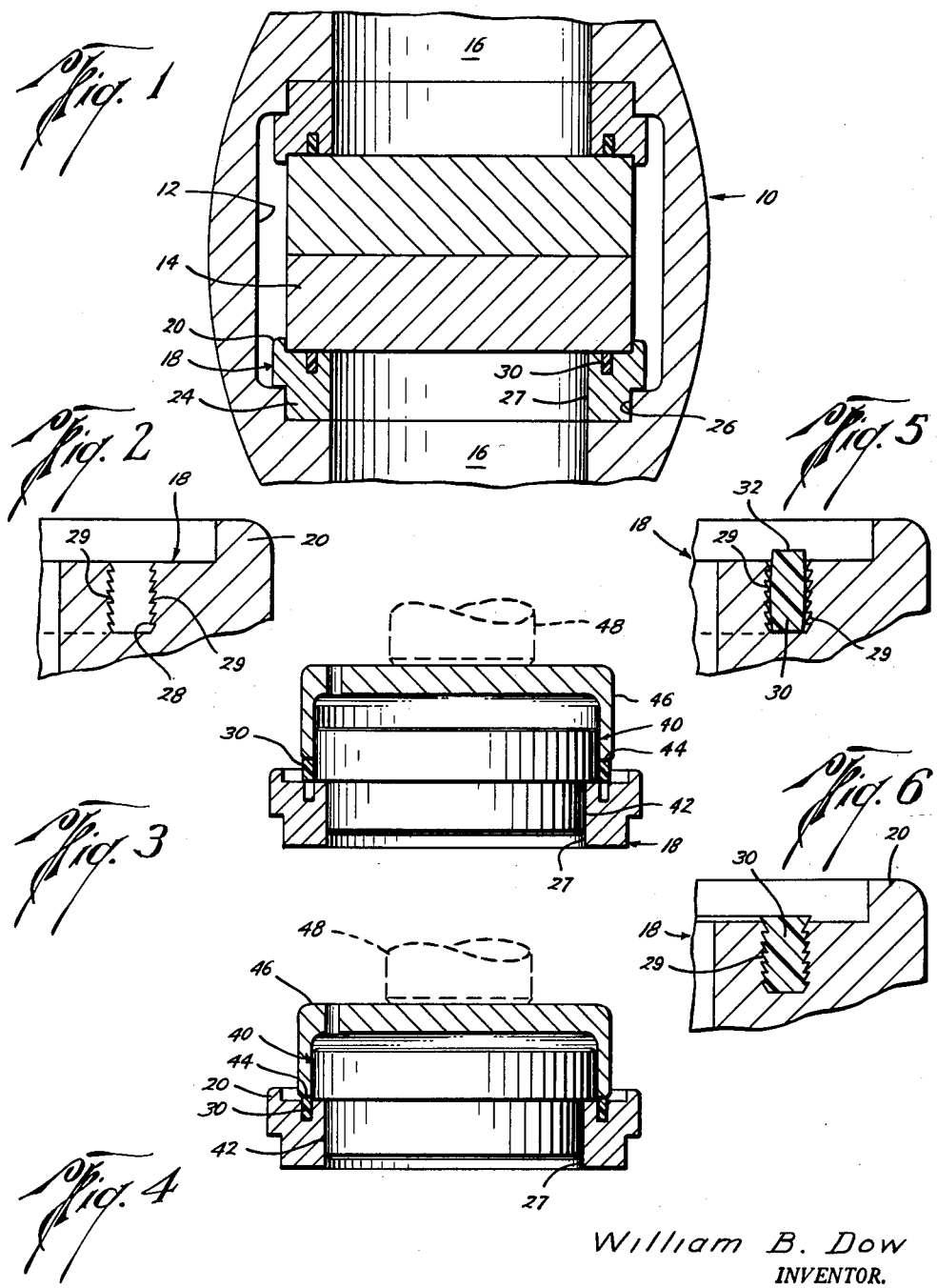

United States Patent Office 3,087,232
Patented Apr. 30, 1963

3,087,232
METHOD OF MANUFACTURING VALVE SEAT
William B. Dow, Windygates, Scotland, assignor to ACF Industries, Incorporated, New York, N.Y., a corporation of New Jersey
Filed Sept. 11, 1959, Ser. No. 839,525
2 Claims. (Cl. 29—157.1)

This invention relates to a novel method of forming a seat member for valves.

Copending United States application S.N. 630,791 filed December 27, 1956, now Patent Number 2,925,993 discloses a novel seat member for through conduit gate valves utilizing an annular resilient plastic insert. It has been found in actual practice that when a gate valve utilizes seats of the above entitled application the valve will hold fluids, even extremely voluble fluids such as propane and butane, under high pressure without leakage. Heretofore, valve control of such voluble fluids under high pressure without leakage could be accomplished only by agumenting the valve seal by the employment of a thick viscous grease or lubricant on the sealing surface. By utilizing the novel valve seat incorporating the resilient insert, the provision of sealant on the sealing surfaces of the valve is unnecessary; therefore, possible contamination of line fluids is eliminated. It has also been found that the use of such seats in expanding double wedge gate valves permits in addition to the bubble tight resilient seal an effective metal-to-metal sealing. It has also been found that the use of such seats in gate valves provides effective wiping action for maintaining the surfaces of the gate members clean.

While the novel seat having the annular plastic insert has many advantages, it is necessary that the annular plastic insert be positively retained in its groove so that as the port of the valve member passes over the insert, the insert is not blown out. The present invention is particularly directed to a method of inserting and retaining the plastic ring into the valve seat.

Generally speaking, the method comprises machining a groove in the valve seat and providing such groove with a screw thread serration. A plastic ring of slightly larger thickness and depth than the groove is placed on a mandrel which is located on the valve seat. Pressure is then applied to a pressure sleeve, first at a very gradual rate to enable pressurized air to escape via the screw thread, then when the plastic ring has reached the bottom of the groove the pressure is increased and allowed to remain for a short period of time. The plastic will cold flow into the screw threads and the ring will be rigidly in place. To further positively clamp the ring, a mandrel having a slight taper is pressed into the bore of the valve seat slightly deforming the material between the bore and groove to further increase the grip of the threads on the plastic insert. After the plastic insert has been thus installed, it is machined to the proper height above the face of the seat.

The principal object of the present invention is to provide an economical method of forming a valve seat having a plastic insert.

It is another object to provide a method of installing a plastic insert in a valve seat which will positively retain the insert in said seat.

It is a further object to provide a method by which a machined or molded plastic ring can be assembled into a valve seat in a manner which will provide positive retention of said insert.

A more specific object of the present invention is to provide a method whereby a plastic ring is inserted by pressure into a prepared groove in a valve seat and the metal surrounding the groove deformed to increase the grip of the groove on the plastic material.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description and are shown in the accompanying drawings, forming a part of the specification, wherein:

FIG. 1 is a fragmentary sectional view through a valve embodying this invention. The valve is shown in the closed position with the gate valve assembly expanded into sealing engagement with the valve seats.

FIG. 2 is a fragmentary sectional view through the seat showing the configuration of the groove.

FIG. 3 is a diagrammatic view showing the plastic ring about to be installed in the valve seat.

FIG. 4 is a view similar to FIG. 2 showing the ram pushing the plastic ring into the groove.

FIG. 5 is a fragmentary sectional view showing the relation of the plastic ring and groove when the ring has just bottomed.

FIG. 6 is a fragmentary sectional view showing the relationship of the plastic ring and groove after the plastic has cold flowed.

FIG. 7 is a diagrammatic view showing the use of a tapered mandrel to further insure locking engagement of the plastic with the threads of the groove.

FIG. 8 is a view similar to FIG. 6 after the mandrel shown in FIG. 7 has been used to further insure locking engagement.

FIG. 9 is a diagrammatic view of a mandrel showing another method of crimping by use of a cup-shaped mandrel.

FIG. 10 is a diagrammatic view showing a further method of crimping by use of a pair of rollers.

Referring now to the drawings, there is shown in FIG. 1 a through conduit gate valve having a housing 10 provided with an interior valve chamber 12 in which is housed the gate mechanism 14 of the valve. Aligned ports 16—16 in opposite walls of the housing 10 are provided at their inner ends with opposed flat face valve seats 18 each having flanges 20 between which the gate mechanism 14 of the valve is confined and guided. The seats 18 are constructed as removable inserts having an annular hub 24 which has a pressed fit in counterbores 26 at the inner ends of the ports 16. The seats are fully described in copending United States application S.N. 630,791, now Patent Number 2,925,993.

Each of the valve seats 18 is provided with an annular groove 28 preferably rectangular in radial section surrounding the corresponding port 27. Mounted in each of these grooves 28 is a ring 30 also rectangular in radial section and slightly greater in axial thickness than the depth of the groove so that the ring 30 projects slightly therefrom. The outer flat annular surface 32 of each ring 30 presents an endless sealing and wiping surface to the opposed metallic face of the gate assemblies 14.

The rings 30 may be formed of tetrafluoroethylene resin. One form of this resin is known by the trademark "Teflon" and is supplied by E. I. du Pont de Nemours & Company, Inc. Teflon is resilient and provides tight, leak-proof sealing. Moreover, Teflon has relatively good strength and stiffness properties over a wide temperature range, and is ideally suited for application where unusual chemical resistance and friction properties are required. Teflon is sustantially inert to all chemicals except molten alkali and fluorine metals and has an extremely low coefficient of friction, .04 against polished steel. As more specifically set forth in the above mentioned copending application 630,791 now Patent Number 2,925,993, an insert of Teflon makes a desirable addition to a valve seat; however, in use with through conduit gate valves where the port passes over the valve it is difficult to retain the Teflon insert in the groove. One method used with some measure of success has been to mold the Teflon directly in the groove; however, this method is rather expensive. The present invention is directed to providing an economical method of inserting and retaining the plastic ring 30 into the valve seat.

As previously mentioned, the valve seat 18 is provided with a groove 28. The groove is provided with a screw thread 29 on both diameters, see FIG. 2. It has been found that for a seat for a 2" valve, a buttress thread .007–.009" in depth will give good holding characteristics as will be hereinafter described. The plastic ring 30 may either be machined from a tube of Teflon or it may be molded to size. It has been found that for a 2" seat it is desirable to have the outside diameter of the plastic ring .002" larger than the outer diameter of the groove, the inner diameter of the ring .002" smaller than the inner diameter of the groove and the height of the ring $\frac{1}{16}"$ greater than the depth of the groove.

To guide the ring 30 into the groove 28 while it is being pressed therein, a mandrel 40 is utilized. The mandrel 40 has a centralizing and locating portion 42 which fits into the bore 27 of the seat 18. The centralizing portion 42 centralizes the mandrel 40 with regard to the groove 28. The mandrel 40 also has a guide portion 44 which extends above the face of the seat in close proximity to the inner wall of the groove 28. The guide portion 44 acts as locating means for a pressure sleeve 46 and as a support for the inner wall of the ring 30. The ring 30 is placed over the guide portion 44 and is in close engagement therewith. The pressure sleeve 46 is placed about the guide portion 44 on top of the ring 30, see FIG. 3. Hydraulic power means 48 supplies pressure to the sleeve 46. As pressure is supplied to the sleeve 46, the sleeve 46 contacts the ring 30 and presses it into the groove 28. The guide portion 44 supports the inner diameter of the ring 30 against collapse as the pressure drives it. The thread being a buttress thread will permit the ring 30 to slip by the crests. In order to prevent the trapping of any air in the groove 28, initial pressure is gradually applied until the ring is bottomed. The gradual application of pressure enables the air in the groove to escape via the threads 29. Since the interference between the crests of the threads 29 and the ring 30 is not very great, the ring will be in snug contact with the crests of the threads, but will not have flowed in the root sections, see FIG. 5. After the ring 30 has reached the bottom of the groove 28, the pressure of the ram is increased to a pressure which will cause the plastic to cold flow. This pressure is held for thirty seconds to a minute. This increased pressure induces flow characteristics of the plastic and causes the plastic to flow into the roots of the threads thereby causing the ring 30 and threaded wall of the groove 28 to become securely interengaged, see FIG. 6. The initial pressure and the pressure used after the ring has been bottomed will depend upon the size of the ring being inserted. The pressure has to be sufficient so that the plastic material will flow into the entire thread profile and all voids in the material are eliminated; however, it can not exceed the pressure which would fracture the material. Heating the ring will decrease the pressure and time required.

After the pressure sleeve 44 and mandrel 42 have been removed, a ram 50 having a 10° taper is pressed into the bore 27 of a valve seat for approximately ¼", see FIG. 6. The entry of the ram 50 into the bore 26 of the seat causes the metal between the bore 26 and the inner wall of the groove 28 to move toward the groove 28 thereby further increasing the grip of the threads on the plastic ring. Instead of using the tapered ram 50, a cup-shaped ram 52 having its inner wall 54 tapered may similarly be used, see FIG. 9. Another method of increasing the grip on the thread is shown in FIG. 10 where a set of rollers 56—58 is used, the roller 56 being tapered to swedge the seat and thereby increase the grip of the thread on the plastic material of the ring.

After the ring 30 has been inserted and provision taken to insure retention, the ring is machined to provide the correct projection above the face of the seat.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. The method of forming a valve seat having an annular insert of tetrafluoroethylene, said method comprising: machining a groove in the face of the valve seat to receive the annular insert; providing the inner and outer diameter of said groove with a screw thread serration having a depth between the crest and root of approximately .008"; placing the preformed insert about a mandrel located on the valve seat, the cross sectional area of said insert being larger than the cross sectional area of the groove, the insert having an inner diameter approximately .002" smaller than the inner diameter of the groove and an outer diameter approximately .002" larger than the outer diameter of the groove and a height approximately $\frac{1}{16}"$ longer than the depth of the groove; applying a gradual pressure to the tetrafluoroethylene insert until it is bottomed; the gradual entry allowing entrapped air in the groove to escape; after the insert is bottomed, increasing the pressure on the insert to induce cold flow characteristics in the tetrafluoroethylene causing the tetrafluoroethylene to flow into the threads, retaining the pressure a sufficient length of time to cause the tetrafluoroethylene to become intimately interengaged with the screw thread serrations; after the pressure is released inserting a tapered ram into the bore of the seat to deform the material causing the threads to further grip the tetrafluoroethylene insert and machining the protruding portion of the insert to the proper height above the face of the seat.

2. The method of forming a valve seat having an insert of plastic material, said method comprising: machining a groove in the face of the valve seat to receive the plastic insert; providing the groove with an insert holding portion of thread serrations having a depth of approximately .008" between the root and crest of such serrations; placing the insert about a mandrel located on the valve seat; the cross sectional area of said insert being larger than the cross sectional area of the groove, the insert having an inner diameter approximately .002" smaller than the inner diameter of the groove and an outer diameter approximately .002" larger than the outer diameter of the groove and a height approximately $\frac{1}{16}"$ longer than the depth of the groove, applying a gradual pressure to the insert until it is bottomed, the gradual entry of the insert allowing entrapped air in the groove to escape; increasing the pressure on the insert to induce cold flow characteristics in the plastic material causing the resilient material to flow into the insert holding portion of the groove; retaining the pressure a sufficient length of time to cause the plastic material to become intimately interengaged with the insert holding portion of the groove, and machining the protruding portion of the insert to the desired height above the face of the seat.

References Cited in the file of this patent

UNITED STATES PATENTS

| 1,909,478 | Wilson | May 16, 1933 |
| 2,925,994 | Downs | Feb. 23, 1960 |

FOREIGN PATENTS

| 643,208 | Great Britain | Sept. 15, 1950 |